(12) United States Patent
Fujiki et al.

(10) Patent No.: US 6,233,812 B1
(45) Date of Patent: *May 22, 2001

(54) ROTARY HEAD DEVICE, MAGNETIC HEAD UNIT AND MANUFACTURING METHOD THEREOF

(75) Inventors: Mitsuhisa Fujiki, Ikoma; Hiroshi Yoda, Hirakata; Tetsuya Okana; Masayuki Hino, both of Katano; Suekazu Kugioka, Osaka, all of (JP)

(73) Assignee: Matsushita Electric Industrial Co., Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/034,354

(22) Filed: Mar. 4, 1998

(30) Foreign Application Priority Data

Mar. 5, 1997 (JP) .................................................. 9-050538

(51) Int. Cl.$^7$ ............................. G11B 5/127; H04R 31/00
(52) U.S. Cl. .................................... 29/603.06; 29/603.01; 29/603.07; 29/603.13
(58) Field of Search ........................... 29/603.06, 603.01, 29/603.04, 603.05, 603.07, 603.13, 603.14, 603.12; 65/43; 360/125, 118, 119, 84, 127, 126, 120, 121, 123

(56) References Cited

U.S. PATENT DOCUMENTS

| | | | | |
|---|---|---|---|---|
| 3,710,235 | * | 1/1973 | Barrager et al. | 324/34 R |
| 3,751,803 | * | 8/1973 | Fisher et al. | 29/603 |
| 3,768,154 | * | 10/1973 | Bol et al. | 29/603 |
| 3,928,908 | * | 12/1975 | Case | 29/603 |
| 4,040,174 | * | 8/1977 | Tsuda | 29/603 |
| 4,106,173 | * | 8/1978 | Morokuma et al. | 29/603 |
| 4,279,633 | * | 7/1981 | Nakamura | 65/41 |
| 4,393,427 | * | 7/1983 | Sakurai | 360/112 |
| 4,711,018 | * | 12/1987 | Matsuzawa | 29/603 |
| 4,888,658 | * | 12/1989 | Ono et al. | 360/126 |
| 5,130,875 | * | 7/1992 | Ono et al. | 360/107 |
| 5,295,032 | * | 3/1994 | Koga et al. | 360/107 |
| 5,426,550 | * | 6/1995 | Mizoh et al. | 360/122 |
| 5,543,990 | * | 8/1996 | Mizoh et al. | 360/122 |
| 5,676,768 | * | 10/1997 | Muraoka et al. | 148/121 |
| 5,694,677 | * | 12/1997 | Tsunoda | 29/603.12 |
| 5,761,008 | * | 6/1998 | Fujiki et al. | 360/107 |
| 5,826,326 | * | 10/1998 | Gooch et al. | 29/603.13 |

* cited by examiner

Primary Examiner—Lee Young
Assistant Examiner—Minh Trinh
(74) Attorney, Agent, or Firm—McDermott, Will & Emery

(57) ABSTRACT

A method of manufacturing the front surface shape of plural magnetic heads precisely in batch in a desired dimension After fixing plural magnetic heads 1, 2 and preliminarily processing curved surfaces along the sliding direction S on a rotary member 4, the curved surfaces Ts along the thickness direction T orthogonal to the sliding direction S of the magnetic heads 1, 2 are formed in batch by finish polishing process by means of abrasive tape or the like.

16 Claims, 8 Drawing Sheets

ROTARY HEAD DEVICE, MAGNETIC HEAD UNIT AND MANUFACTURING METHOD THEREOF

BACKGROUND OF THE INVENTION

The present invention relates to a rotary head device and a magnetic head unit having plural magnetic heads on a rotary member and a head base, used in magnetic recording and reproducing apparatus such as VTR, and a manufacturing method thereof.

FIG. 9 is a structural diagram of a magnetic head unit used in a conventional rotary head device for VHS system. Magnetic heads 31, 32 are fixed on a head base 33. In a manufacturing process of magnetic heads, usually, the front surfaces of the magnetic heads 31, 32 are finished along the sliding direction S and the thickness direction T (vertical direction to the sheet of paper) orthogonal to the sliding direction S to specified dimensions by tape polishing process, after machining. More specifically, first, the front surfaces Ss of the magnetic heads 31, 32 are machined by leaving an allowance for finishing by tape polishing process. Then, by using a polishing tape, the front surfaces Ss are processed in curvature to the portion indicated by broken line R in FIG. 9, after being adhered to the head base 33.

As shown in FIG. 9, when the magnetic heads 31, 32 are processed simultaneously, the front surfaces Ss are processed along the sliding direction S over two magnetic heads 31, 32. In the conventional magnetic head for VHS system, the gap M of the two magnetic heads 31, 32 is about 0.7 mm. The thickness of the magnetic recording tape for VHS system is about 20 microns. Therefore, even in the magnetic heads finished over two magnetic heads, the magnetic heads contact with the magnetic tape smoothly.

In the recent digital VTR, in order to cope with various functions, the gap M of the magnetic heads is extended to 1.2 to 4.5 mm. The thickness of the magnetic tape for the digital VTR to realize high recording density is very thin, as compared with the magnetic tape for VHS system, and is nearly 7 to 14 microns. In the rotary head device in such digital VTR, therefore, the magnetic tape may sink in between the magnetic heads and may be damaged by the edges of the magnetic heads. To prevent this damage, it is necessary to finish individually the curved surfaces Ss along the sliding direction S of the individual magnetic heads.

FIG. 10 is a plan view of a conventional magnetic head unit for a digital VTR after processing. Radii $Rs_1$, $Rs_2$ of curved surfaces Ss along the sliding direction S of the magnetic heads 31, 32 fixed on the head base 33 are identical. However, the positions of their centers $Or_1$, $Or_2$ are different.

In a conventional method of manufacturing the magnetic head unit for the digital VTR, the process is complicated, that is, once the respective magnetic head is fixed on a provisional base, and the curved surface is processed by tape polishing. Then, the respective magnetic head is dismounted from the provisional base, and the plural magnetic heads 31, 32 are fixed on the head base 33 as the final step.

In the conventional magnetic head unit, since the radii $Rs_1$, $Rs_2$ of adjacent magnetic heads 31, 32 are identical, optimum conditions are not obtained for improving the contact state between the head and tape due to effects of the layout of plural magnetic heads 31, 32 on the common head base 33, and for reducing the wear of heads.

Moreover, when disposing multiple magnetic heads on a smaller rotary drum for high density recording, the ratio of area occupied by the magnetic heads including head base on the rotary drum is high. Therefore, the design is much limited in the fixing method of rotary drum on the rotor, and connecting method of magnetic heads and rotary transformer unit. Still more, to cope with higher recording data rate, if the number of magnetic heads is increased, the space for disposing the head base is limited, and it is more difficult to realize.

SUMMARY OF THE INVENTION

It is hence an object of the invention to present a manufacturing method of rotary head device and a manufacturing method of magnetic head unit, capable of processing the front shape of plural magnetic heads precisely in batch to a specified dimension in a simple manufacturing process.

It is other object to present a rotary head device and a magnetic head unit for realizing a favorable interface between plural magnetic heads and a magnetic tape, manufactured by a method of the invention.

In the invention, curved surfaces along the sliding direction of individual magnetic heads are formed by machining or other means before fixing on a rotary member or a head base, and, after fixing the plural magnetic heads on the rotary member or head base, the curved surfaces along the thickness direction of the plural magnetic heads are finished in batch by tape polishing or other means. According to this method, the independent plural magnetic heads having curved surfaces in the sliding direction mounted on the rotary member or head base can be processed in batch to a desired front surface by finishing polishing means such as tape, without requiring complicated processes of fixing temporarily and processing the front surfaces individually.

In a preferred aspect of the invention, the central position of the curved surface along the sliding direction of a magnetic head is set so as to be present at the intersection of the gap position of the magnetic head and the position of center of rotation of the rotary member. As a result, it does not matter whether the configuration is such that the gap line of the magnetic head is directed to the center of the rotary member, or the configuration is such that the gap line of the magnetic head is parallel to the center line of the rotary member.

In other preferred aspect of the invention, the size of the curved surface formed preliminarily along a sliding direction is different from the size of the adjacent magnetic head. As a result, depending on the characteristics of the adjacent magnetic heads at the leading side and trailing side in the magnetic tape running direction, the contact of heads and tape may be improved, and the wear of heads may be reduced.

In a different preferred aspect of the invention, the magnetic heads are fixed directly on a rotary member without using a head base. As a result, the area occupied by the magnetic heads on the rotary drum is saved, and the degree of freedom is increased in design, such as the fixing method of rotary drum on the rotor unit or the connecting method of magnetic heads and rotary transformer unit. Therefore, the rotary head device of smaller size and suited to higher density recording can be produced efficiently.

DESCRIPTION OF THE PREFERRED EMBODIMENTS (Embodiment 1)

Figure 1:
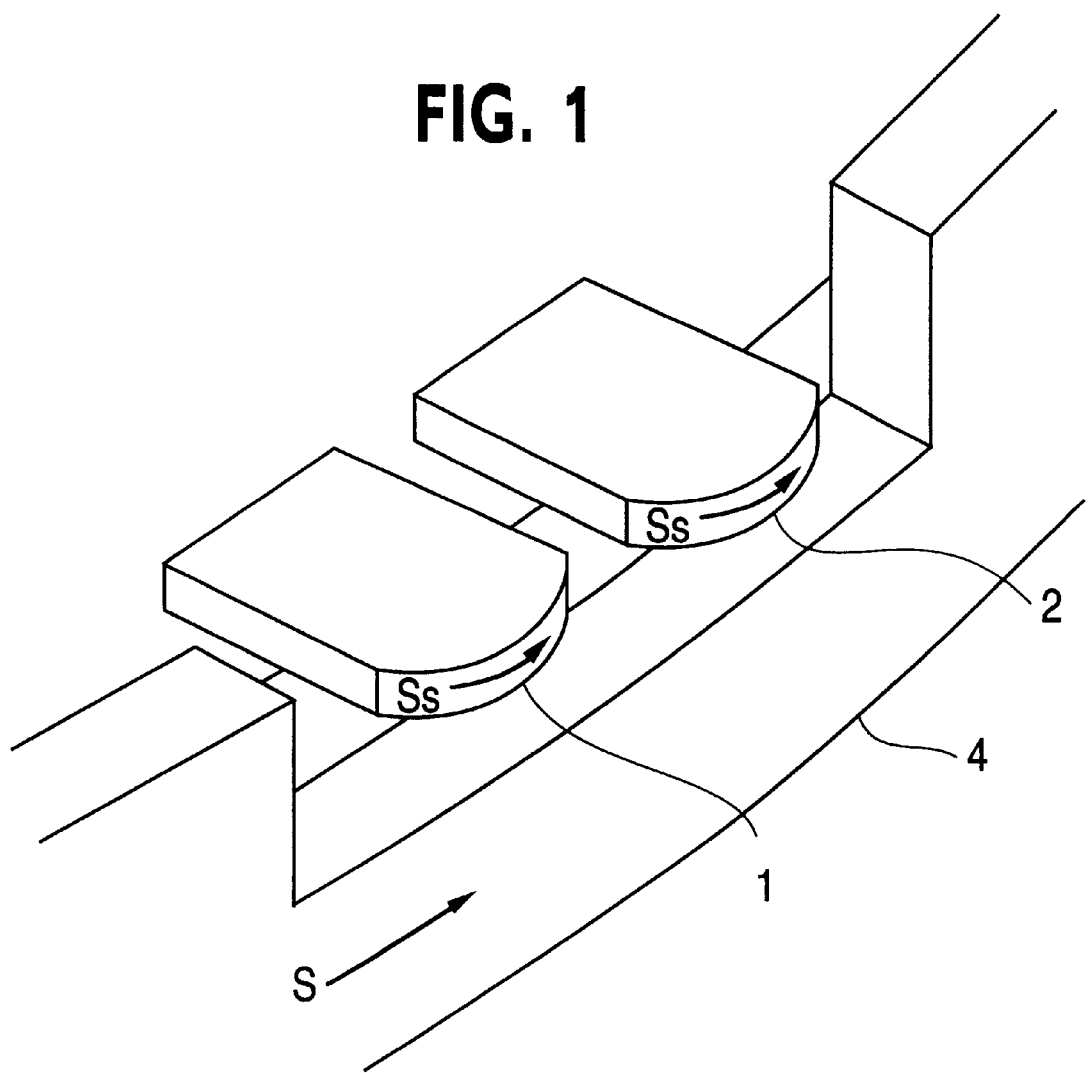
FIG. 1 is a perspective view showing a state before finish polishing process of magnetic heads in a rotary head device for explaining a first embodiment of the invention.

A first embodiment is described below while referring to FIG. 1 through FIG. 4. As shown in FIG. 1, magnetic heads 1, 2 are preliminarily processed on curved surfaces Ss along the sliding direction (the arrow direction) before finish polishing process, and are fixed on a rotary member 4 composed of a rotary drum.

Figure 2:
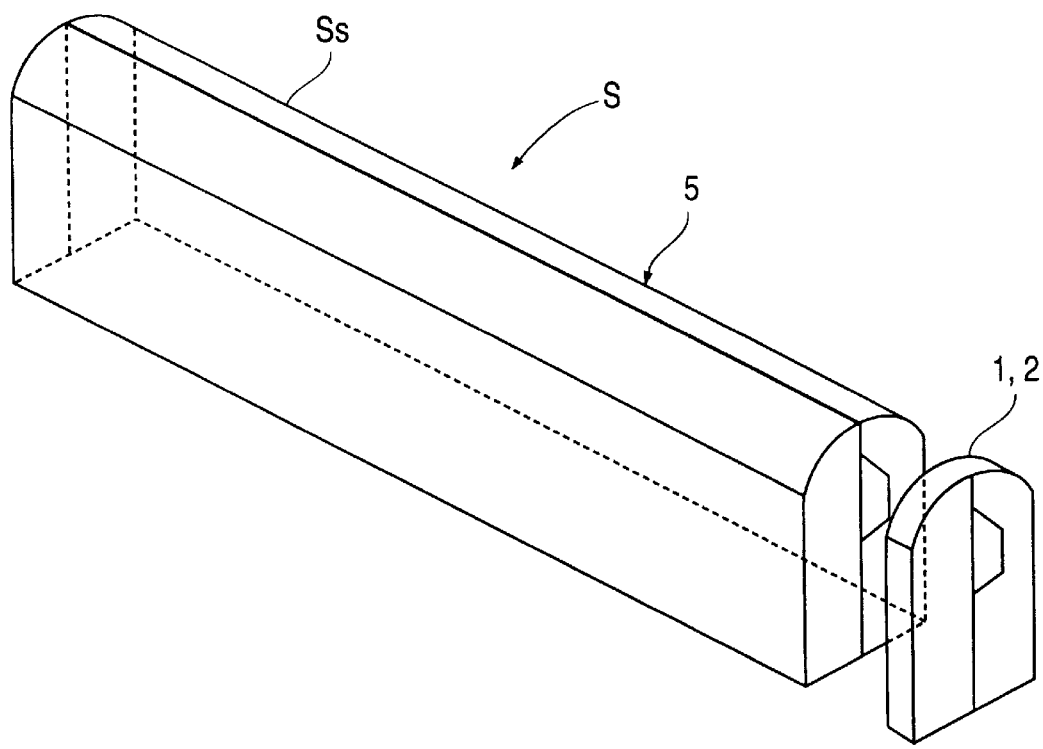
FIG. 2 is a perspective view showing a preliminary process of magnetic heads in the rotary head device in FIG. 1.

In a preliminary process of the magnetic heads, as shown in FIG. 2, the curved surfaces Ss of the magnetic heads 1, 2 are processed into a curved surface by machining mean such as grinding, at the head front surface, in a bar state 5 of the gap junction stage in previous process. Afterwards, in a chip slice process, the bar state 5 of the gap junction stage is cut out as individual magnetic heads 1. 2.

Figure 3:
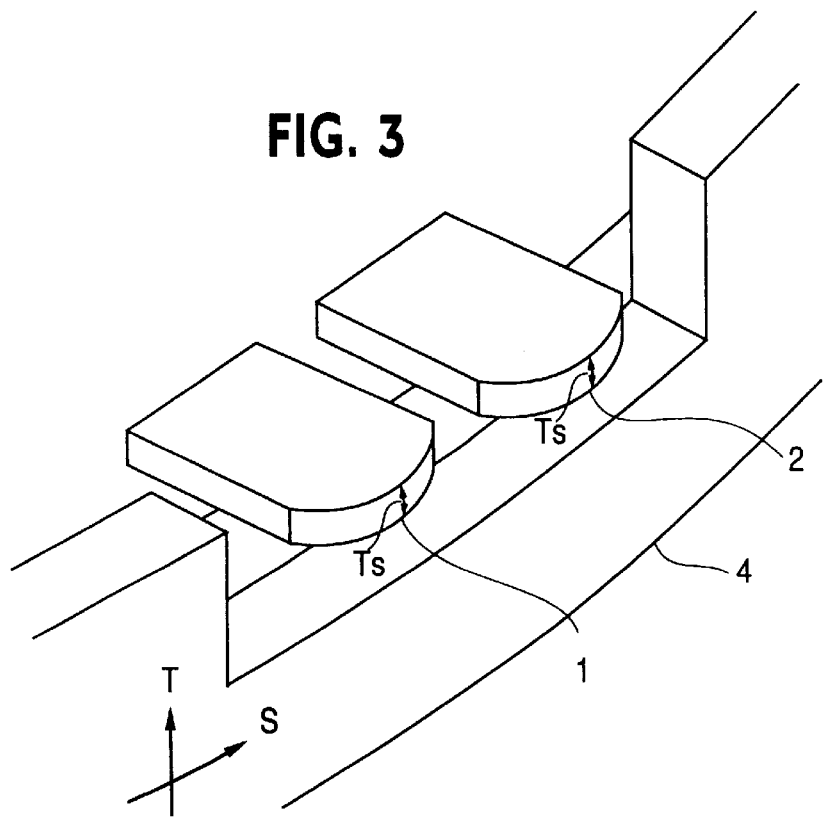
FIG. 3 is a perspective view showing a completed state of magnetic heads in the rotary head device in FIG. 1.

In the magnetic heads 1, 2 fixed on the rotary member 4, as shown in FIG. 3, the curved surfaces Ss are finished in batch to the curved surfaces Ts by polishing with abrasive tape along the thickness direction T of the magnetic heads 1, 2.

Thus, in this embodiment, after fixing plural magnetic heads (two in the illustrated example) 1, 2 on the rotary member 4, of which the curved surfaces Ss are processed preliminarily, and then the curved surfaces Ss of the magnetic heads 1, 2 are processed to the curved surfaces Ts by finish polishing in batch by means of abrasive tape or the like. Therefore, not requiring complicated preliminary processing by fixing provisionally, the desired magnetic head unit is obtained.

Figure 4:
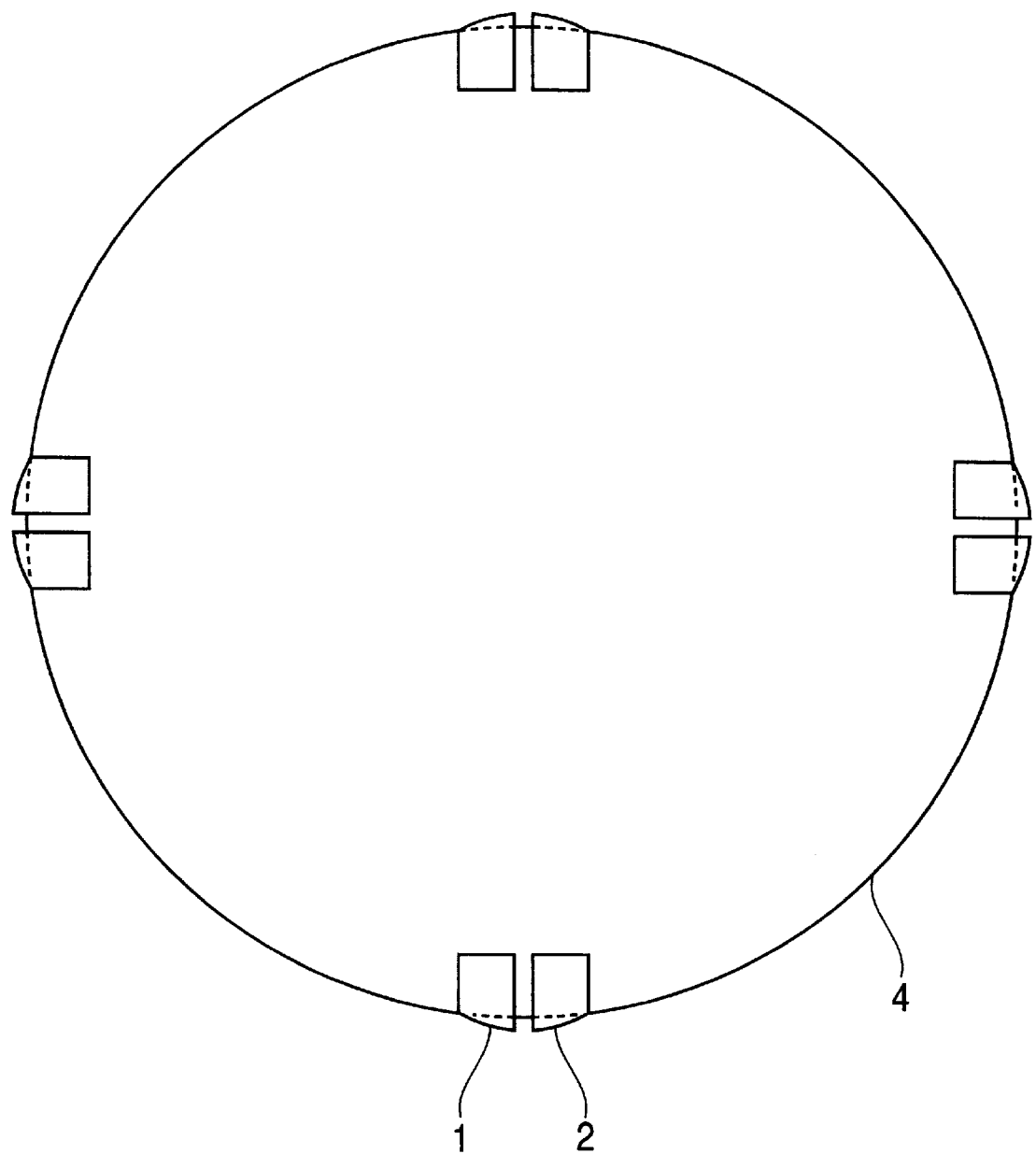
FIG. 4 is a plan view showing a magnetic head portion of the entire rotary head device in the first embodiment.

FIG. 4 is a plan view showing the magnetic head portion of the rotary head device. The two magnetic heads 1, 2 making up a pair are disposed on the rotary member 4 at a spacing of, for example, 90°, and by the polishing method above, the front surfaces of the pair of magnetic heads 1, 2 are finished in batch.

(Embodiment 2)

Figure 5:
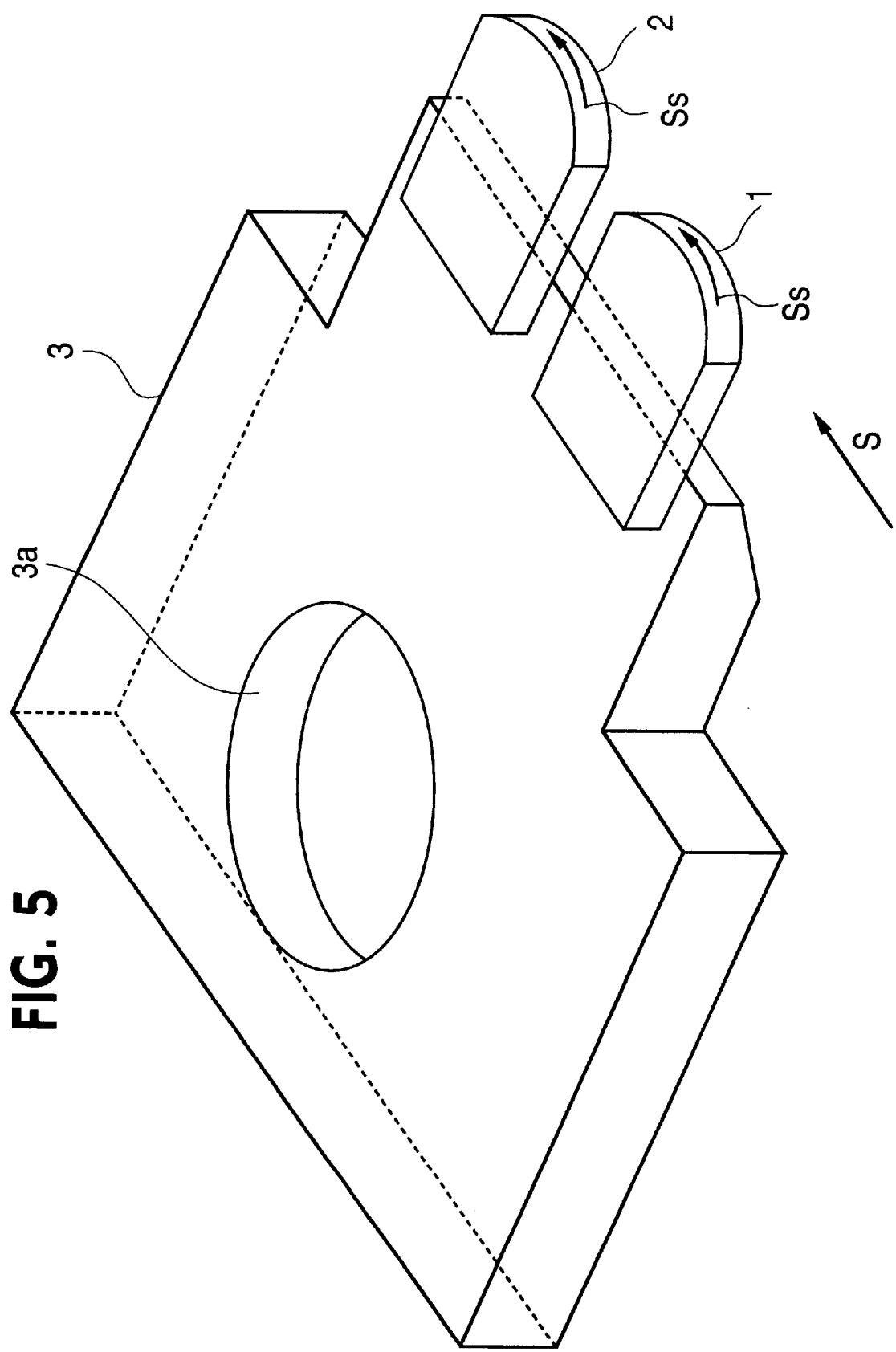
FIG. 5 is a perspective view showing a state before finish polishing process of a magnetic head unit to be fixed on a rotary head device for explaining a second embodiment of the invention.
Figure 6:
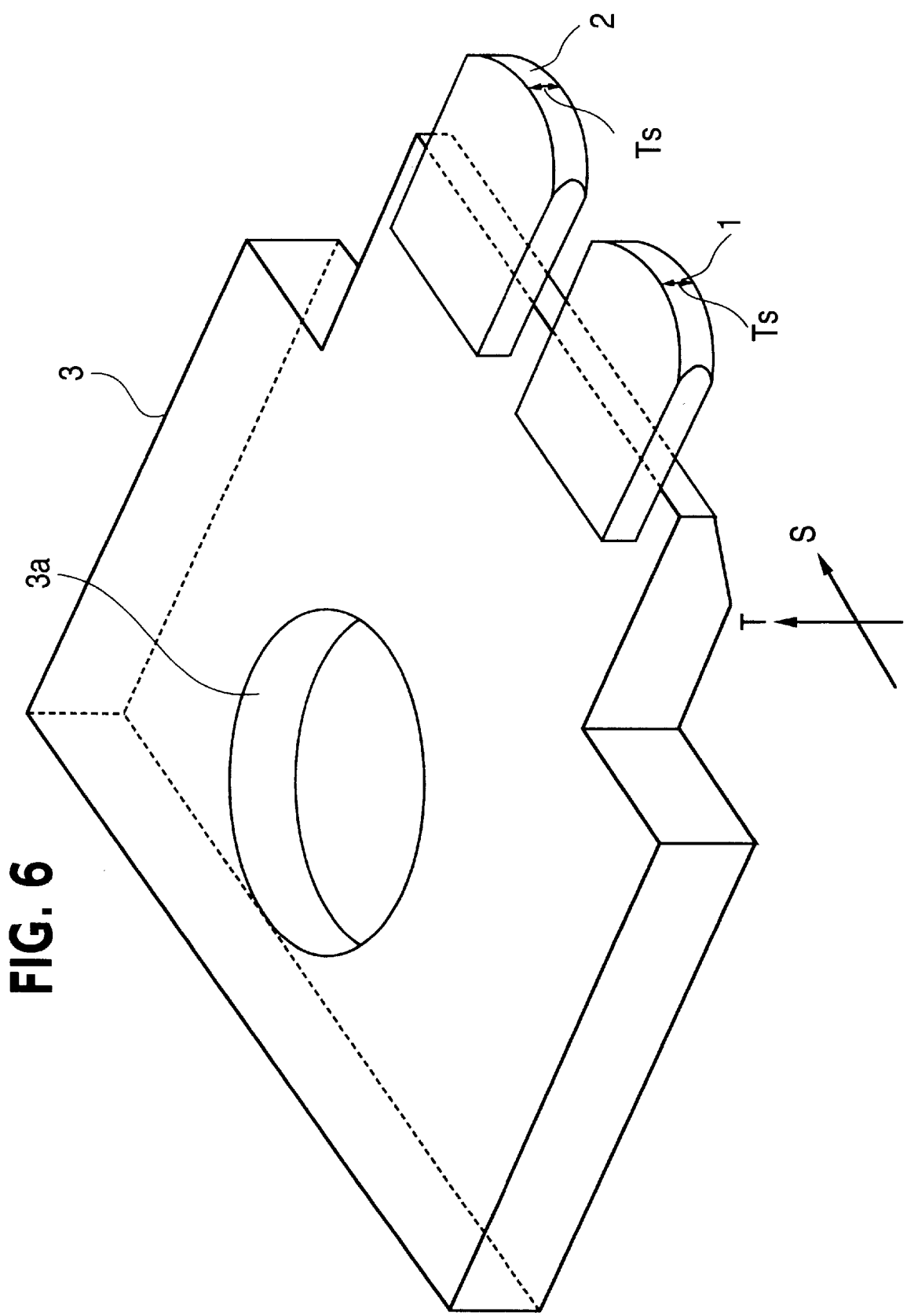
FIG. 6 is a perspective view showing a completed state of magnetic head unit in the rotary head device in FIG. 5.

A magnetic head unit in a second embodiment of the invention is described while referring to FIG. 5 and FIG. 6. As shown in FIG. 5, before finish polishing process, the magnetic heads 1, 2 of which curved surfaces Ss are finished preliminarily along the sliding direction S are fixed on a head base 3. The head base 3 is fixed to a rotary member (not shown) as a screw is inserted into its central hole 3a. Then, as shown in FIG. 6, the curved surfaces Ts of the magnetic heads 1, 2 are finished by tape polishing along the thickness direction T.

Thus, the plural magnetic heads 1,2 are finished in batch after fixing the plural magnetic heads 1. 2 having the curved surfaces Ss preliminarily processed on the head base 3, and therefore, the desired magnetic head unit is obtained without requiring complicated preliminary polishing processing with provisional fixing.

(Embodiment 3)

Figure 7:
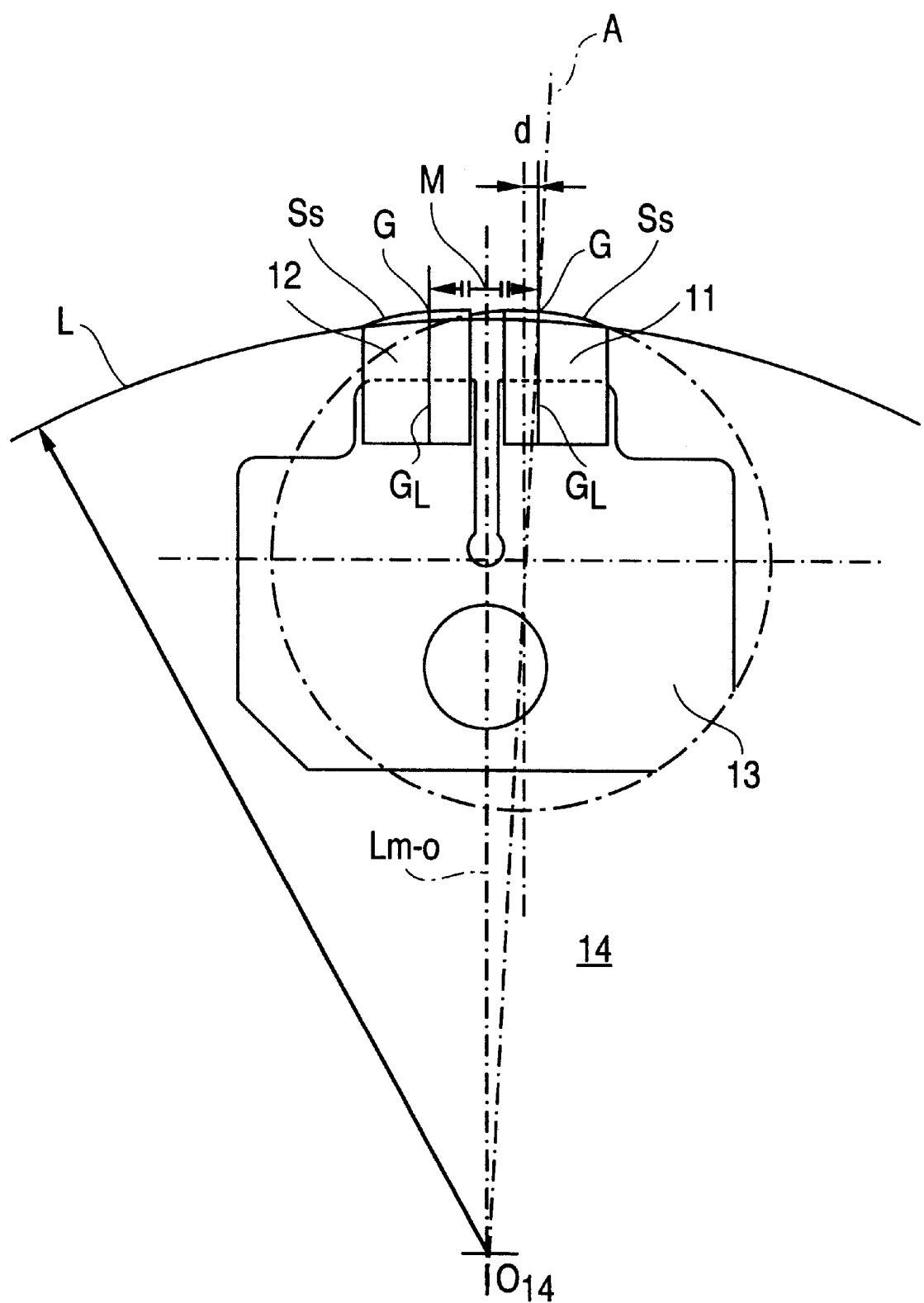
FIG. 7 is an explanatory diagram showing plane dimensional relation before finish polishing process of magnetic head unit in a rotary head device for explaining a third embodiment of the invention.

A third embodiment of the invention is described while referring to FIG. 7.

In FIG. 7, magnetic heads 11, 12 are fixed to a head base 13. L denotes a line indicating the outer circumference of a rotary member 14. The central position of a circle constituting the curved surface Ss of the magnetic head 11 is located on the line A linking the center $O_{14}$ of the rotary member 14 and the gap G position of the magnetic head 11.

This location is necessary for keeping a favorable contact between the magnetic head and tape, and two methods are considered for keeping this configuration.

In one method, the center of the curved surface Ss of the magnetic head 11 is disposed on the gap line $G_L$, when the magnetic head 11 itself is disposed at an inclination in order that the gap line $G_L$ may be directed to the center $O_{14}$ of the rotary member 14.

In other method, as shown in FIG. 7, the center of the curved surface Ss of the magnetic head 11 is disposed on the line A linking the center $O_{14}$ of the rotary member 14 and the gap G position of the magnetic head 11, when the magnetic heads 11, 12 are disposed so that the gap lines $G_L$ of the magnetic heads 11, 12 may be parallel to the line $L_{m-o}$ linking the middle point M of the line connecting the peaks of gap G of the magnetic heads 11, 12 and the center $O_{14}$ of the rotary member 14.

These configurations indicate that the center of the curved surface Ss is deviated by the distance d indicated in FIG. 7 from the gap line $G_L$ in processing, when processing the curved surface in the magnetic head 11 only. Thus, when processing, for example, in the bar state of the head shown in FIG. 2, by processing the curved surface by deviating the distance d, the degree of freedom of location of magnetic head is increased, and it is advantageous, for example, in a small-sized device not having enough space for inclining the magnetic head. It is also a benefit that the degree of freedom is increased in the design of the device for adhering and fixing the magnetic heads on the head base.

(Embodiment 4)

A fourth embodiment of the invention is described below while referring to FIG. 8. Magnetic heads 21, 22 are fixed on a head base 23, and the radius R1 of the curved surface Ss of the magnetic head 21 at the trailing side of tape running is set smaller than the radius $R_2$ of the curved surface Ss of the magnetic head 22 at the leading side of tape running.

By thus setting $R_1$ smaller than $R_2$, the contact pressure with the tape is increased, and the contact with the tape of the trailing side magnetic head 21 is kept more favorably. Moreover, by setting the curved surface along the sliding direction of the magnetic head at the leading side on the tape pattern larger than the curved surface along the sliding direction of the magnetic head at the trailing side, the contact area is increased, and the head abrasion of the trailing side magnetic head can be decreased.

Figure 8:
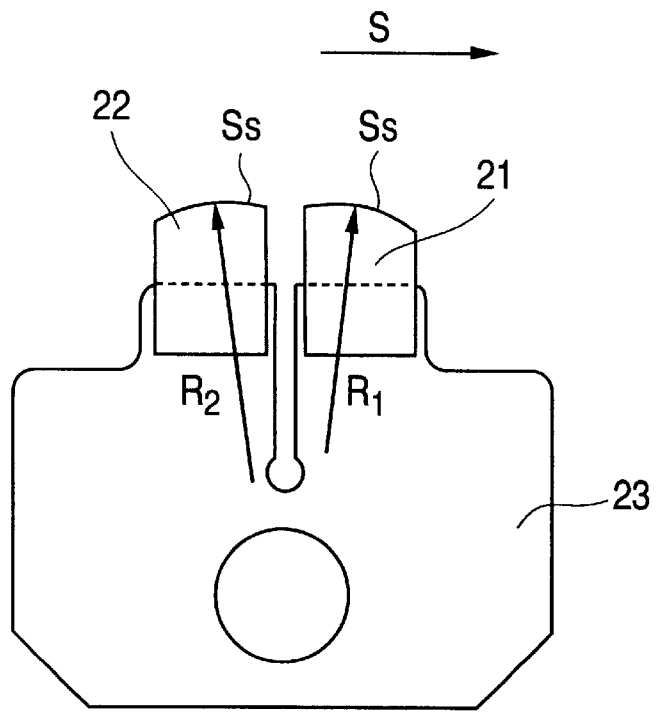
FIG. 8 is a plan view of a magnetic head unit in a rotary head device for explaining a fourth embodiment of the invention.
Figure 9:
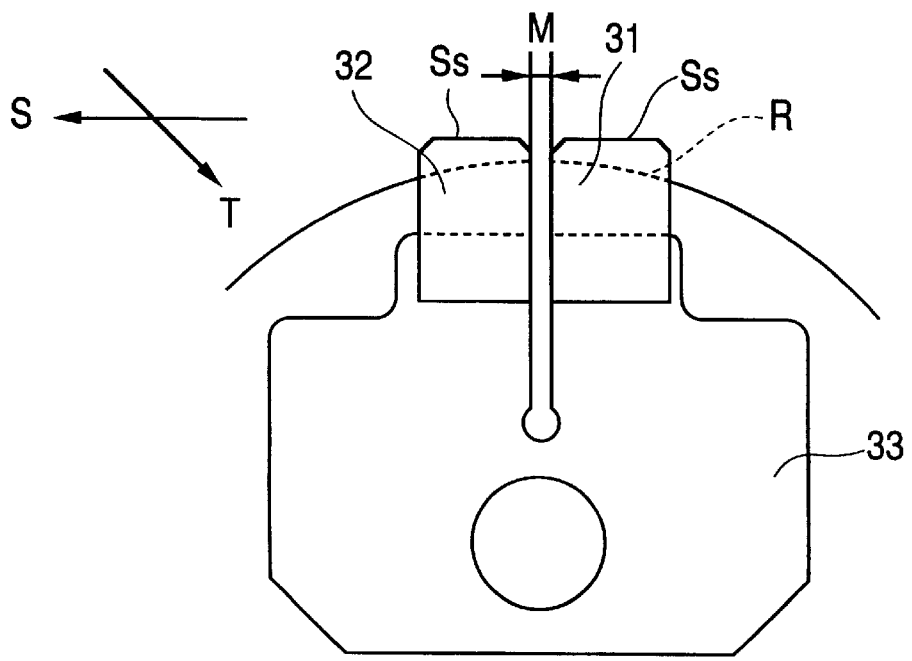
FIG. 9 is a structural diagram of a magnetic head unit in a conventional rotary head device.
Figure 10:
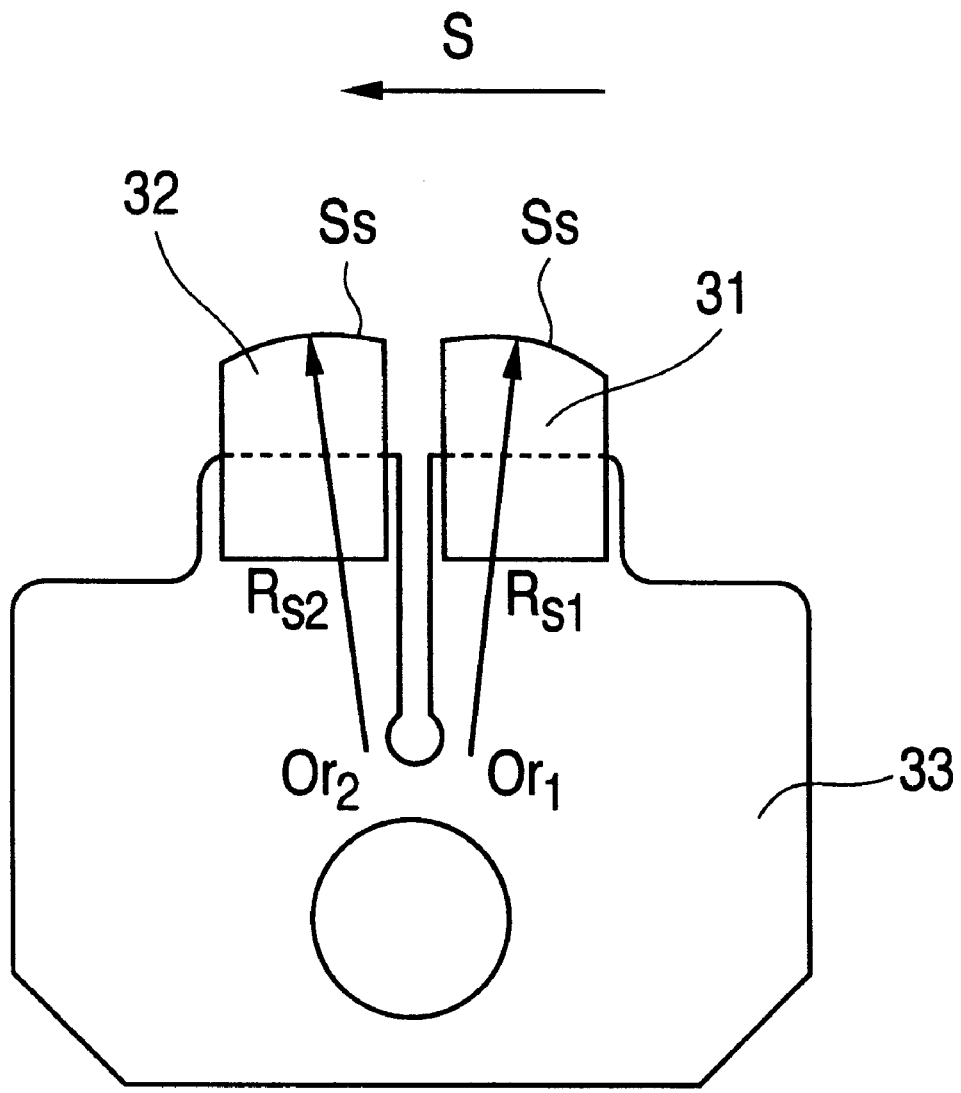
FIG. 10 is an explanatory diagram of dimensional relation of a conventional magnetic head.

In the magnetic heads 21, 22 shown in FIG. 8, by finishing in batch by polishing process after setting the diameters $R_1$, $R_2$ of the curved surfaces Ss of the magnetic heads 21, 22 preliminarily in the prior process of curved surface processing, the magnetic head unit having a desired front surface shape is obtained without complicated prior polishing process by fixing provisionally.

It is explained herein that the magnetic heads 21, 22 are disposed on the head base 23, but same effects and actions are obtained by disposing the magnetic heads directly on the rotary member. In the above description, there are two adjacent magnetic heads, but same effects are obtained by using three or more. The diameter of the curved surface in the sliding direction of the magnetic head at the leading side of tape running is set larger than at the trailing side, but it is also realized in a reverse relation. The rotary member is a rotary drum, but the bar-shaped rotary member may be applied to the method and apparatus of the embodiments.

What is claimed is:

1. The method of manufacturing a rotary head device comprising the steps of:

first, forming curved surfaces on plural magnetic heads along a sliding direction of the plural magnetic heads;

second, fixing said plural magnetic heads having said curved surfaces along the sliding direction on a rotary member; and third, forming in batch curved surfaces on each of said plural magnetic heads along a thickness direction of the fixed plural magnetic heads.

2. The method of manufacturing a rotary head device of claim 1, wherein the central position of the curved surface along the sliding direction of one of the plural magnetic heads is present on a line linking the gap position on the magnetic head and the central position of rotation of the rotary member.

3. The method of manufacturing a rotary head device of claim 1, wherein radii of the curved surfaces along the sliding direction of the adjacent magnetic heads are mutually different.

4. The method of manufacturing a rotary head device of claim 1, wherein the plural magnetic heads are fixed on the rotary member through a head base.

5. The method of manufacturing a rotary head device of claim 1, wherein the rotary member comprises a rotary drum, and the plural magnetic heads are directly fixed on the rotary drum.

6. The method of manufacturing a rotary head device recited in claim 1, wherein said curved surfaces formed along the sliding direction and the thickness direction are arranged on a respective same surface of each of said plurality of magnetic heads.

7. The method of manufacturing a rotary head device recited in claim 1, wherein said sliding direction and said thickness direction are perpendicular to one another.

8. The method of manufacturing a rotary head device recited in claim 1, wherein said first step of forming curved surfaces on plural magnetic heads along a sliding direction of the plural magnetic heads comprises the steps of: forming a curved surface along a sliding direction of a block of material and thereafter slicing said block of material into said plural magnetic heads.

9. The method of manufacturing a rotary head device recited in claim 6, wherein said respective same surface of each of said plurality of magnetic heads face away from said rotary member.

10. A method of manufacturing a magnetic head unit comprising the steps of:

first forming curved surfaces on plural magnetic heads along a sliding direction of the plural magnetic heads;

second, fixing said plural magnetic heads having said curved surfaces along the sliding direction on a head base; and third, forming in batch curved surfaces on each of said plural magnetic heads along a thickness direction of the fixed plural magnetic heads.

11. The method of manufacturing a magnetic head unit of claim 10, wherein the head base is held on a rotary member, and the central position of the curved surface along the sliding direction of one of the plural magnetic heads is present on a line linking the gap position on the magnetic head and the position of center of rotation of the rotary member.

12. The method of manufacturing a magnetic head unit of claim 10, wherein radii of the curved surfaces along the sliding direction of the adjacent magnetic heads are mutually different.

13. The method of manufacturing a magnetic head unit recited in claim 10, wherein said curved surfaces formed along the sliding direction and the thickness direction are arranged on a respective same surface of each of said plurality of magnetic heads.

14. The method of manufacturing a magnetic head unit recited in claim 13, wherein said respective same surface of each of said plurality of magnetic heads face away from said head base.

15. The method of manufacturing a magnetic head unit recited in claim 10, wherein said sliding direction and said thickness direction are perpendicular to one another.

16. The method of manufacturing a magnetic head unit recited in claim 10, wherein said first step of forming curved surfaces on plural magnetic heads along a sliding direction of the plural magnetic heads comprises the steps of: forming a curved surface along a sliding direction of a block of material and thereafter slicing said block of material into said plural magnetic heads.

* * * * *